(12) United States Patent
Morioka et al.

(10) Patent No.: US 10,481,353 B2
(45) Date of Patent: Nov. 19, 2019

(54) OPTICAL RECEPTACLE, OPTICAL MODULE, AND METHOD FOR PRODUCING OPTICAL MODULE

(71) Applicant: Enplas Corporation, Saitama (JP)

(72) Inventors: Shimpei Morioka, Saitama (JP); Ayano Kon, Saitama (JP); Koki Ono, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 16/089,397

(22) PCT Filed: Mar. 15, 2017

(86) PCT No.: PCT/JP2017/010368
§ 371 (c)(1),
(2) Date: Sep. 28, 2018

(87) PCT Pub. No.: WO2017/169774
PCT Pub. Date: Oct. 5, 2017

(65) Prior Publication Data
US 2019/0086623 A1 Mar. 21, 2019

(30) Foreign Application Priority Data
Mar. 28, 2016 (JP) ................. 2016-064117

(51) Int. Cl.
*G02B 6/42* (2006.01)
(52) U.S. Cl.
CPC .......... *G02B 6/4286* (2013.01); *G02B 6/425* (2013.01); *G02B 6/4206* (2013.01); *G02B 6/4214* (2013.01)
(58) Field of Classification Search
USPC ........................................ 385/24, 31, 47, 88
See application file for complete search history.

(56) References Cited

U.S. PATENT DOCUMENTS 6,198,864 B1 * 3/2001 Lemoff .............. G02B 6/29367
385/24
6,282,000 B1 * 8/2001 Kikuchi ............... G02B 6/4246
398/136

(Continued)

FOREIGN PATENT DOCUMENTS

JP 2015-022267 A 2/2015

OTHER PUBLICATIONS

International Search Report from International Application No. PCT/JP2017/010368 dated Jun. 13, 2017.

*Primary Examiner* — Eric Wong
(74) *Attorney, Agent, or Firm* — Brundidge & Stanger, P.C.

(57) ABSTRACT

The problem addressed by the present invention is to provide: an optical receptacle that can be easily positioned with a photoelectric converter having a light-emitting element and a detection element. In order to solve the problem, an optical receptacle is provided, said optical receptacle being positioned between a light transmission medium and a photoelectric converter having a substrate, a photoelectric conversion element and a detection element, and the purpose of the optical receptacle being to optically couple the photoelectric conversion element and the end surface of the light transmission medium. The optical receptacle comprises a filter, a holding member for holding the filter, and a receptacle body. In the optical receptacle the holding member and the receptacle body are separate bodies, and the filter reflects towards the detection element side, as monitor light, part of the light emitted from the photoelectric conversion element, and transmits the remainder as signal light.

5 Claims, 10 Drawing Sheets

(56) References Cited

U.S. PATENT DOCUMENTS

| | | |
|---|---|---|
| 9,063,281 B2* | 6/2015 | Lin .................... G02B 6/4286 |
| 9,801,578 B2* | 10/2017 | Weber ................ A61B 5/0071 |
| 2015/0030285 A1 | 1/2015 | Tanazawa |
| 2016/0004020 A1* | 1/2016 | Shao .................. G02B 6/4246 385/24 |
| 2016/0119074 A1* | 4/2016 | McColloch ......... G02B 6/4286 398/88 |

\* cited by examiner

OPTICAL RECEPTACLE, OPTICAL MODULE, AND METHOD FOR PRODUCING OPTICAL MODULE

TECHNICAL FIELD

Conventionally, in optical communications using an optical transmission member such as an optical fiber and an optical waveguide, an optical module including a light emitting element such as a surface-emitting laser (e.g. a vertical-cavity surface-emitting laser (VCSEL)) has been used. Such an optical module includes an optical receptacle that operates such that light containing communication information emitted from a light emitting element is incident on an end surface of the optical transmission member.

In addition, for the purpose of adjusting the optical output or stabilizing the output performance of a light emitting element against temperature variation, some optical modules include a detection element for checking (monitoring) the intensity and the quantity of the emission light emitted from the light emitting element (see, for example, PTL 1).

PTL 1 discloses an optical module including a photoelectric conversion device in which a light-emitting element and a detection element are disposed on a substrate, and an optical receptacle disposed on the substrate of the photoelectric conversion device and configured to optically connect the light-emitting element and an end surface of an optical transmission member.

Figure 1:
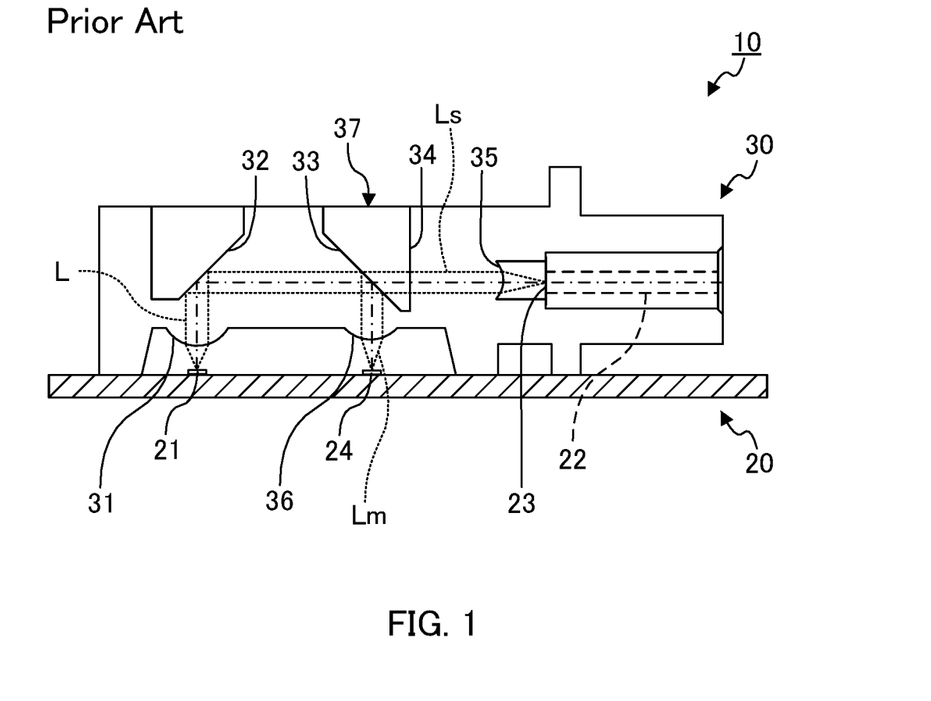
FIG. 1 illustrates a configuration of the optical module disclosed in PTL 1.

FIG. 1 is a sectional view schematically illustrating a configuration of optical module 10 disclosed in PTL 1. As illustrated in FIG. 1, optical module 10 disclosed in PTL 1 includes photoelectric conversion device 20 and resin optical receptacle 30. Optical receptacle 30 includes first optical surface 31 that allows incidence of emission light L emitted from light-emitting element 21, reflection surface 32 that reflects light L having entered optical receptacle 30 from first optical surface 31 toward optical transmission member 22 side, light separation part 33 that separates light L reflected by reflection surface 32 into monitor light Lm travelling toward detection element 24 side and signal light Ls travelling toward optical transmission member 22 side, transmission surface 34 that allows signal light Ls emitted out of optical receptacle 30 by light separation part 33 to reenter optical receptacle 30, second optical surface 35 that emits signal light Ls having entered optical receptacle 30 from transmission surface 34 such that the light is condensed at end surface 23 of optical transmission member 22, and third optical surface 36 that emits monitor light Lm toward detection element 24. In addition, light separation part 33 is formed as a part of the inner surface of recess 37 formed in optical receptacle 30.

In optical module 10 disclosed in PTL 1, light L emitted from light-emitting element 21 and entered optical receptacle 30 from first optical surface 31 is reflected by reflection surface 32 toward light separation part 33. Light L reflected by reflection surface 32 is separated by light separation part 33 into signal light Ls and monitor light Lm. Monitor light Lm separated by light separation part 33 is emitted from third optical surface 36 toward the light-receiving surface of detection element 24. Meanwhile, signal light Ls separated by light separation part 33 passes through light separation part 33 and is then emitted out of optical receptacle 30. Then, the light reenters optical receptacle 30 from transmission surface 34. The signal light Ls having reentered optical receptacle 30 from transmission surface 34 is emitted from second optical surface 35 toward end surface 23 of optical transmission member 22.

CITATION LIST

Patent Literature

PTL 1
Japanese Patent Application Laid-Open No. 2015-022267

SUMMARY OF INVENTION

Technical Problem

As described above, in optical module 10 disclosed in PTL 1, optical receptacle 30 is disposed above photoelectric conversion device 20. In this optical module 10, to optically connect light-emitting element 21 with an end surface of optical transmission member 22 with high efficiency, it is important to appropriately dispose optical receptacle 30 with respect to light-emitting element 21. For example, optical receptacle 30 may be positioned by observing the light-emitting surface of light-emitting element 21 from the second optical surface 35 side of optical receptacle 30 through reflection surface 32 and first optical surface 31. In this case, the position of optical receptacle 30 is adjusted based on the position of the center of the light-emitting surface of light-emitting element 21 visually recognized in second optical surface 35.

However, in the case where photoelectric conversion device 20 includes also detection element 24 as in optical module 10 disclosed in PTL 1, it is important to appropriately dispose optical receptacle 30 with respect to detection element 24. In such an optical module 10, alignment of light-emitting element 21 and optical receptacle 30, and alignment of detection element 24 and optical receptacle 30 are required to be simultaneously performed. In conventional optical receptacle 30, however, it is difficult to appropriately dispose optical receptacle 30 with respect to both light-emitting element 21 and detection element 31, and as such alignment of optical receptacle 30 and photoelectric conversion device 20 might reduce the manufacturing yield of optical module.

An object of the present invention is to solve the above-mentioned points, and is to provide an optical receptacle which can be readily aligned with a photoelectric conversion device including a light-emitting element and a detection element, and to provide an optical module including the optical receptacle. Another object of the present invention is to provide a method of manufacturing an optical module which can appropriately align a photoelectric conversion device and an optical receptacle.

Solution to Problem

An optical receptacle according to an embodiment of the present invention is configured to be disposed between a photoelectric conversion device and an optical transmission member, the photoelectric conversion device including a substrate, a photoelectric conversion element disposed on the substrate, and a detection element disposed on the substrate and configured to monitor light emitted from the photoelectric conversion element, the optical receptacle being configured to optically couple the photoelectric conversion element and an end surface of the optical transmission member, the optical receptacle including: a filter disposed on a light path between the photoelectric conversion element and the optical transmission member; a holding member configured to hold the filter; and a receptacle main body disposed nearer to the optical transmission member than the filter on the light path, and including a first optical surface configured to allow incidence of light having passed through the filter, and a second optical surface configured to emit, toward the end surface of the optical transmission member, light having entered the receptacle main body from the first optical surface and having passed through inside of the receptacle main body. The holding member and the receptacle main body are independent from each other. The filter reflects, toward the detection element side as monitor light, a part of light emitted from the photoelectric conversion element, and allows, to pass through the filter toward the first optical surface of the receptacle main body as signal light, a remaining part of the light emitted from the photoelectric conversion element.

An optical module according to an embodiment of the present invention includes: a photoelectric conversion device including a substrate, a photoelectric conversion element disposed on the substrate, and a detection element disposed on the substrate and configured to monitor light emitted from the photoelectric conversion element; and the optical receptacle. The holding member is disposed on the substrate such that the filter is opposite to the photoelectric conversion element. The receptacle main body is disposed above the holding member.

A method of manufacturing the optical module according to an embodiment of the present invention includes: placing the holding member configured to hold the filter on the substrate of the photoelectric conversion device including the substrate, the photoelectric conversion element disposed on the substrate, and the detection element disposed on the substrate and configured to monitor light emitted from the photoelectric conversion element; positioning the holding member such that light, which has been obtained by causing the photoelectric conversion element to emit light and has been reflected by the filter, reaches the detection element; disposing the receptacle main body above the holding member; and positioning the receptacle main body such that light, which has been emitted from the photoelectric conversion element, has passed through the filter, and has entered the receptacle main body from the first optical surface, reaches the second optical surface.

Advantageous Effects of Invention

According to the present invention, it is possible to provide an optical receptacle which can be easily and appropriately aligned with respect to the photoelectric conversion device, and an optical module including the optical receptacle. In addition, according to the present invention, it is possible to provide an optical module which can be manufactured at low cost and in a short time.

DESCRIPTION OF EMBODIMENTS

An embodiment of the present invention is described below in detail with reference to the accompanying drawings. The present invention is not limited to the embodiment described below.

Configuration of Optical Module

Figure 2:
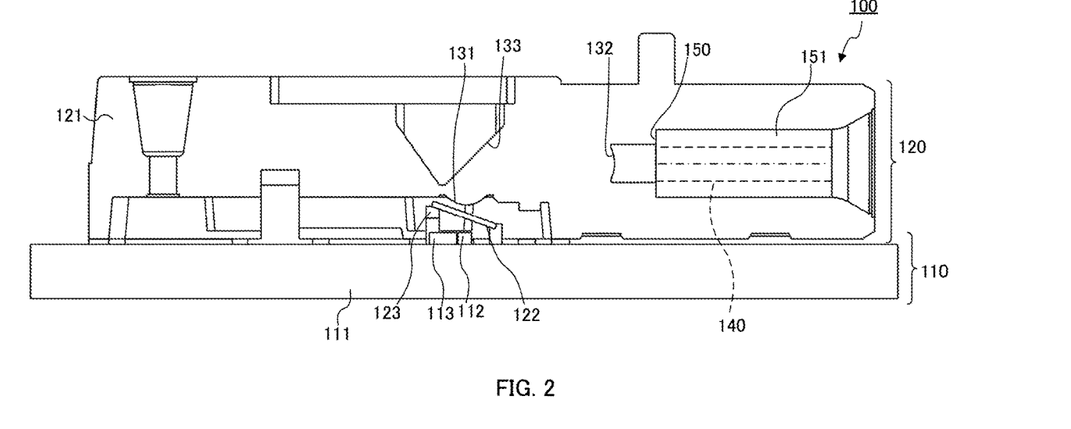
FIG. 2 is a sectional view schematically illustrating a configuration of an optical module according to an embodiment.

FIG. 2 is a sectional view schematically illustrating a configuration of optical module 100 according to an embodiment of the present invention. It is to be noted that, in FIG. 2, the hatching on the cross-section of optical receptacle 120 and photoelectric conversion device 110 is omitted.

As illustrated in FIG. 2, optical module 100 includes substrate 111, photoelectric conversion device 110 of a substrate-mounted type including detection element 113 and photoelectric conversion element (in the present embodiment, a light-emitting element) 112 disposed on substrate 111, and optical receptacle 120.

It is to be noted that optical module 100 of the present embodiment is a module for transmission, and is used in the state where optical transmission member 140 is connected with receptacle main body 121 via ferrule 151. The type of optical transmission member 140 which can be connected to optical module 100 of the present embodiment is not limited, and may be an optical fiber, an optical waveguide or the like. The optical fiber may be of a single mode type, or a multiple mode type. In addition, while a plurality of optical transmission members 140 may be connected to optical module 100, one optical fiber is connected in the present embodiment. It is to be noted that, in the following description, the surface on which optical transmission member 140 is connected is "front surface" of optical module 100 and/or receptacle main body 121.

In photoelectric conversion device 110 of optical module 100 of the present embodiment, one photoelectric conversion element 112, and one detection element 113 are disposed on substrate 111. Substrate 111 of photoelectric conversion device 110 is not limited as long as light-emitting element 112 and/or detection element 113 can be supported, and the type and the size of substrate 111 is appropriately selected in accordance with the use of optical module 100. Substrate 111 may be a glass composite substrate, a glass epoxy substrate, a flexible substrate or the like, for example.

In addition, in the case where optical module 100 is a module for reception, a module for reception and transmission or the like, photoelectric conversion element 112 may be a light-receiving element, or both a light-emitting element and a light-receiving element; however, since optical module 110 of the present embodiment is an optical module for transmission, the photoelectric conversion element is light-emitting element 112. The type of light-emitting element 112 and/or the shape of the light-emitting surface are not limited, and may be a vertical cavity surface emitting laser (VCSEL) having a circular light-emitting surface or the like, for example. In the present embodiment, light-emitting element 112 is disposed so as to emit laser light in a direction perpendicular to the front surface of substrate 111.

Detection element 113 is disposed on substrate 111. The type of detection element 113 is not limited as long as the intensity and/or quantity of light emitted from light-emitting element 112 can be monitored, and may be a photodiode (PD), for example. While detection element 113 is disposed such that the light reception surface of detection element 113 is parallel to the front surface of substrate 111 in the present embodiment, detection element 113 may be disposed such that the light reception surface is tilted to the front surface of substrate 111 so that detection element 113 can easily receive monitor light Lm.

While detection element 113 is disposed on the back side (the side opposite to optical transmission member 140) of light-emitting element 112 in the present embodiment, the installation position of detection element 113 in photoelectric conversion device 110 is not limited. For example, detection element 113 may be disposed on the front surface (optical transmission member 140) side of light-emitting element 112, or on a lateral side (near or far side in the depth direction in FIG. 2) of light-emitting element 112.

Further, a control part (not illustrated) may be disposed on substrate 111 of photoelectric conversion device 110. The control part, which is electrically connected with light-emitting element 112, detection element 113 and/or the like through wiring, controls the output of light emitted from light-emitting element 112 and the like based on the intensity and/or quantity of monitor light Lm received by detection element 113.

Figure 6:
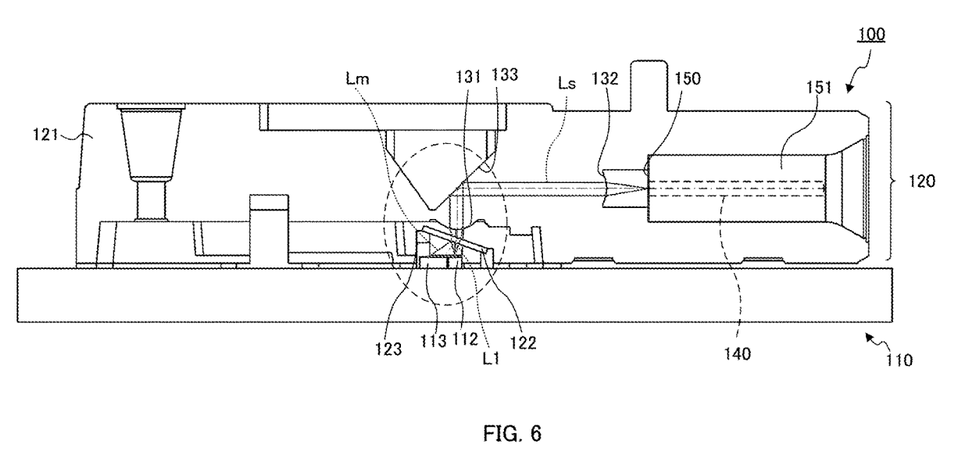
FIG. 6 illustrates light paths in the optical module according to the embodiment.

Optical receptacle 120, which is disposed between photoelectric conversion device 110 and optical transmission member 140, optically couples light-emitting element 112 and end surface 150 of optical transmission member 140 together. As illustrated in FIG. 6, optical receptacle 120 of the present embodiment includes filter 122 for separating light L1 emitted from light-emitting element 112 into monitor light Lm and signal light Ls, and holding member 123 for holding filter 122, and receptacle main body 121. Here, receptacle main body 121 and holding member 123 are independent members. As used herein, "receptacle main body 121 and holding member 123 are independent members" means that receptacle main body 121 and holding member 123 are independent members completely separated from each other in manufacture of optical module 100. It should be noted that receptacle main body 121 and holding member 123 may be integrated in manufactured optical module 100 by means of fitting, bonding and the like.

Here, filter 122 of optical receptacle 120, which is a plate-shaped member having a uniform thickness, reflects, toward detection element 113 side as monitor light Lm, a part of light L1 emitted from light-emitting element 112, and allows, to pass therethrough toward receptacle main body 121 side as signal light Ls, the remaining part of light L1 emitted from light-emitting element 112, as illustrated in FIG. 6. The shape of the surface for reflection or transmission of light L1 emitted from light-emitting element 112 is not limited, and may be a rectangular shape, a circular shape, or an ellipse shape.

In optical module 100 of the present embodiment, filter 122 is disposed between light-emitting element 112 and first optical surface 131 of receptacle main body 121 described later. In addition, filter 122 is disposed such that the front surface of filter 122 is tilted to the light-emitting surface of light-emitting element 112. The front surface of filter 122 is tilted to the light-emitting surface of light-emitting element 112, and thus light (monitor light Lm) reflected by filter 122 reaches detection element 113. In the present embodiment, filter 122 is disposed such that the distance between the front surface of filter 122 and the light-emitting surface of light-emitting element 112 decreases toward the front surface (optical transmission member 140 side) of optical module 100. It should be noted that the inclination direction and/or inclination angle of filter 122 is appropriately set in accordance with the position of detection element 113.

The structure of filter 122 is not limited as long as light emitted from light-emitting element 112 can be separated into monitor light Lm and signal light Ls, and filter 122 may be a member including an optically transparent base material (not illustrated), and a reflection/transmission film (not illustrated) formed on the optically transparent base material for example. The optically transparent base material may be any plate-shaped base material composed of a material having a high transmittance for the wavelength of light emitted from light-emitting element 112, and may be a base material composed of glass, polyetherimide (PEI), cyclic olefin resin, and/or the like. The optically transparent base material may be formed as a member separated from holding member 123 described later, or as a member integrally formed with holding member 123.

On the other hand, the reflection/transmission film may be a single layer film composed of a single metal such as Ni, Cr, Al or the like, or a dielectric multi-layer film including a plurality of alternately stacked dielectrics (e.g. $TiO_2$ and $SiO_2$) having different dielectric constants. Such a reflection/transmission film can be formed on the above-described optically transparent base material by inconel deposition or the like. By inconel deposition or the like, the reflection/transmission film can be formed in a form of a very thin film having a thickness of 1 μm or smaller.

The light reflectivity and light transmittance of filter 122 are set in accordance with the quantity of monitor light Lm required for detection element 113 and/or the quantity of signal light Ls to be delivered to optical transmission member 140, and may be set in accordance with the material and/or thickness of the reflection/transmission film. For example, in the case where the reflection/transmission film is composed of a single layer film made of a single metal such as Ni, Cr or Al, the reflection/transmission film may have a reflectivity of 20% and a transmittance of 60%, (absorptivity: 20%) although this setting may vary depending on the thickness of the film, for example. In addition, in the case where the reflection/transmission film is composed of a dielectric multi-layer film including a plurality of alternately stacked dielectrics (e.g. $TiO_2$ and $SiO_2$) having different dielectric constants, the reflection/transmission film may have a reflectivity of 10% and a transmittance of 90% although this setting may vary depending on the thickness and/or the number of layers of the film.

On the other hand, the shape of holding member 123 for holding filter 122 is not limited as long as filter 122 can be disposed between light-emitting element 112 and first optical surface 131 of receptacle main body 121, and as long as the light path between light-emitting element 112 and optical transmission member 140 is not blocked.

Figure 3A:
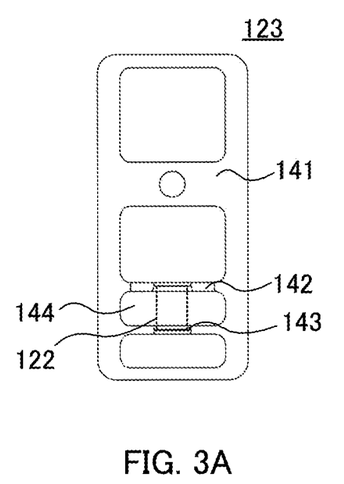
FIGS. 3A to 3E illustrate a configuration of a holding member according to the embodiment.
Figure 3B:
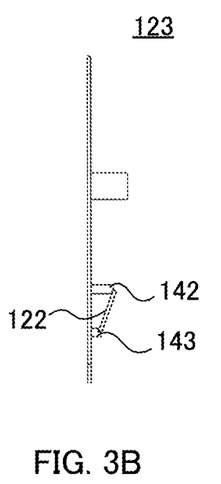
Figure 3C:
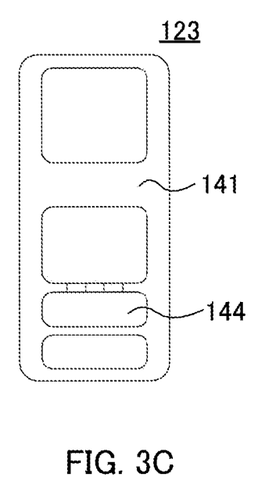
Figure 3D:
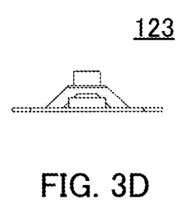
Figure 3E:
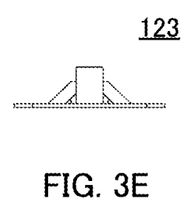

FIGS. 3A to 3E illustrate a configuration of holding member 123 of the present embodiment. FIG. 3A is a plan view of holding member 123, FIG. 3B is a side view of holding member 123, FIG. 3C is a bottom view of holding member 123, FIG. 3D is a front view of holding member 123, and FIG. 3E is a rear view of holding member 123. Holding member 123 of the present embodiment includes plate-shaped supporting body 141, and first and second protrusions 142 and 143 each of which has a prism shape and is formed on supporting body 141. Filter 122 is supported on the top surface of first protrusion 142 and the top surface of second protrusion 143 of holding member 123. Since first protrusion 142 is higher than second protrusion 143, filter 122 is supported such that the front surface of filter 122 is inclined to the light-emitting surface of light-emitting element 112. While an end portion of filter 122 is fixed to the top surface of first protrusion 142 and the top surface of second protrusion 143 of holding member 123 with an adhesive agent (e.g. a heat/ultraviolet curable resin) and the like in the present embodiment, the way of fixing filter 122 is not limited to this. In the case where grooves or the like for fitting an end portion of filter 122 are formed in first protrusion 142 and second protrusion 143, filter 122 may be fixed by fitting filter 122 in the grooves.

In addition, to prevent interference with light-emitting element 112 and detection element 113 of photoelectric conversion device 110 when holding member 123 is disposed on substrate 111, through holes 144 are formed in holding member 123 of the present embodiment at positions corresponding to the elements. In addition, the shape of supporting body 141 is not limited as long as intimate contact with substrate 111 can be achieved, and the larger the area, the more stably filter 122 and/or receptacle main body 121 can be supported.

The material of holding member 123 of the present embodiment is not limited as long as supporting body 141, first protrusion 142, second protrusion 143, through hole 144 and the like can be formed in desired shapes, and may be a mold made of a publicly known resin or the like.

While supporting body 141 of holding member 123 is fixed on substrate 111 of photoelectric conversion device 110 in the present embodiment, the way of fixing is not limited to this, and supporting body 141 may be fixed by a publicly known way using an adhesive agent (e.g. a heat/ultraviolet curable resin).

On the other hand, receptacle main body 121 is a member that allows incidence, on first optical surface 131, of signal light Ls which has been emitted from the light-emitting surface of light-emitting element 112 and has passed through filter 122, and emits, from second optical surface 132 toward end surface 150 of optical transmission member 140, the signal light Ls which has passed through the inside of receptacle main body 121 as illustrated in FIG. 6.

Figure 4A:
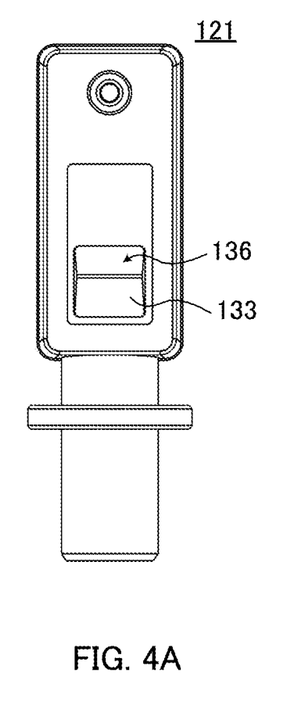
FIGS. 4A to 4E illustrate a configuration of a receptacle main body of an optical receptacle according to the embodiment.
Figure 4B:
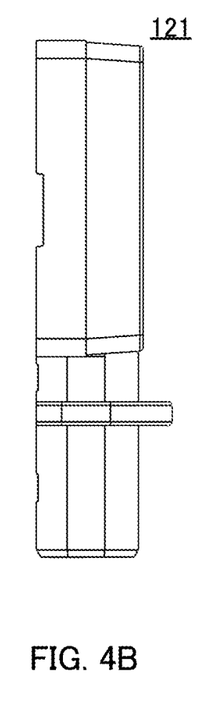
Figure 4C:
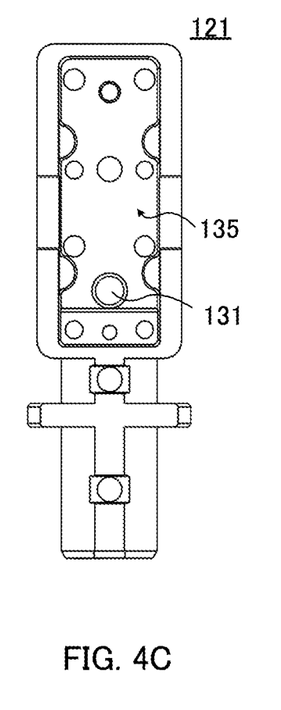
Figure 4D:
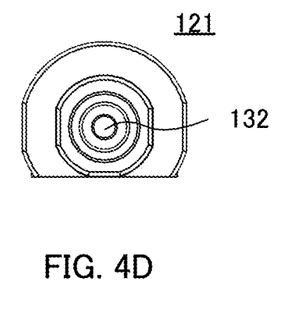
Figure 4E:
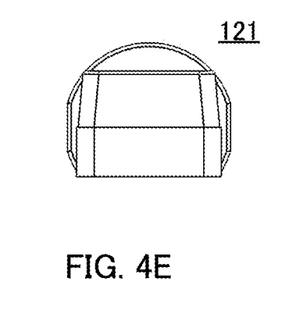
Figure 5:
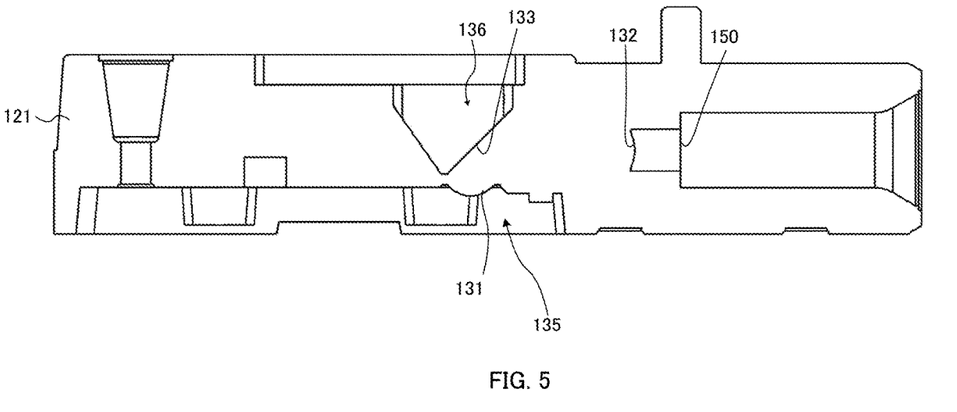
FIG. 5 is a sectional view schematically illustrating a configuration of the receptacle main body of the optical receptacle according to the embodiment.

Receptacle main body 121 includes one first optical surface 131, one second optical surface 132, and one reflection surface 133. FIGS. 4A to 4E illustrate a configuration of receptacle main body 121 of the present embodiment. FIG. 4A is a plan view of receptacle main body 121, FIG. 4B is a side view of receptacle main body 121, FIG. 4C is a bottom view of receptacle main body 121, FIG. 4D is a front view of receptacle main body 121, and FIG. 4E is a rear view of receptacle main body 121. In addition, FIG. 5 is a sectional view of receptacle main body 121. It should be noted that, in FIG. 5, the hatching on the cross-section of receptacle main body 121 is omitted.

As illustrated in FIGS. 4A to 4E, receptacle main body 121 is a member having a substantially cuboid shape. In addition, first recess 135 having a substantially quadrangular truncated shape is formed in the bottom surface of receptacle main body 121 as illustrated in FIG. 4C and FIG. 5. On the other hand, second recess 136 having a substantially pentagonal prism shape is formed in the top surface of receptacle main body 121 as illustrated in FIG. 4A and FIG. 5.

First optical surface 131 of receptacle main body 121 is an optical surface that allows, to enter receptacle main body 121, signal light Ls emitted from light-emitting element 112 and passed through filter 122 while refracting the signal light Ls. At this time, first optical surface 131 converts signal light Ls passed through filter 122 into collimate light. First optical surface 131 is formed on the bottom surface of recess 135 to face the light-emitting surface of light-emitting element 112. In the present embodiment, first optical surface 131 has a shape of a convex lens surface protruding toward light-emitting element 112. In addition, first optical surface 131 has a circular shape in plan view as illustrated in FIG. 4C. Preferably, the central axis of first optical surface 131 is perpendicular to the light-emitting surface of light-emitting element 112. In addition, preferably, the central axis of first optical surface 131 coincides with the optical axis of emission light L1 emitted from light-emitting element 112.

Reflection surface 133 of receptacle main body 121 reflects, toward second optical surface 132 side in the direction along substrate 111, signal light Ls incident on first optical surface 131. Reflection surface 133 is a part of the inner surface of second recess 136. Reflection surface 133 is tilted such that the distance of reflection surface 133 to optical transmission member 140 (front surface side) decreases from the bottom surface toward the top surface of optical receptacle main body 121. The inclination angle of reflection surface 133 is not limited. In the present embodiment, the inclination angle of reflection surface 133 is 45 degrees with respect to the optical axis of light incident on reflection surface 133. The shape of reflection surface 133 is not limited, and may be a plane or a curved surface. In the present embodiment, reflection surface 133 has a plane shape. Light L1 incident on first optical surface 121 is incident on reflection surface 133 at an incident angle greater than the critical angle.

Second optical surface 132 of receptacle main body 121 is an optical surface that emits, toward end surface 150 of optical transmission member 140, signal light Ls refracted by reflection surface 133. At this time, second optical surface 132 emits signal light Ls toward end surface 150 of optical transmission member 140 while converging signal light Ls. In the present embodiment, second optical surface 132 has a shape of a convex lens surface protruding toward end surface 150 of optical transmission member 140. In plan view, second optical surface 132 has a circular shape. Preferably, the central axis of second optical surface 132 is perpendicular to end surface 150 of optical transmission member 140.

The type of the material of receptacle main body 121 is not limited as long as receptacle main body 121 is formed with a material that is optically transparent to the wavelength of light emitted from light-emitting element 112. Examples of the material of receptacle main body 121 include transparent resins such as polyetherimide (PEI) and cyclic olefin resin.

In addition, while receptacle main body 121 is fixed above holding member 123 in the present embodiment, the way fixing is not limited, and receptacle main body 121 may be fixed by a publicly known way using an adhesive agent (e.g. a heat/ultraviolet curable resin).

It is to be noted that fitting parts (not illustrated) for fitting receptacle main body 121 and holding member 123 may be formed in receptacle main body 121 and holding member 123. As elaborated later in the description of the method of manufacturing optical module 100, it is necessary to align receptacle main body 121 above holding member 123 in manufacture of optical module 100. Accordingly, it is preferable that the fitting parts have a clearance enough for the alignment of receptacle main body 121.

Light Path in Optical Module

Figure 7:
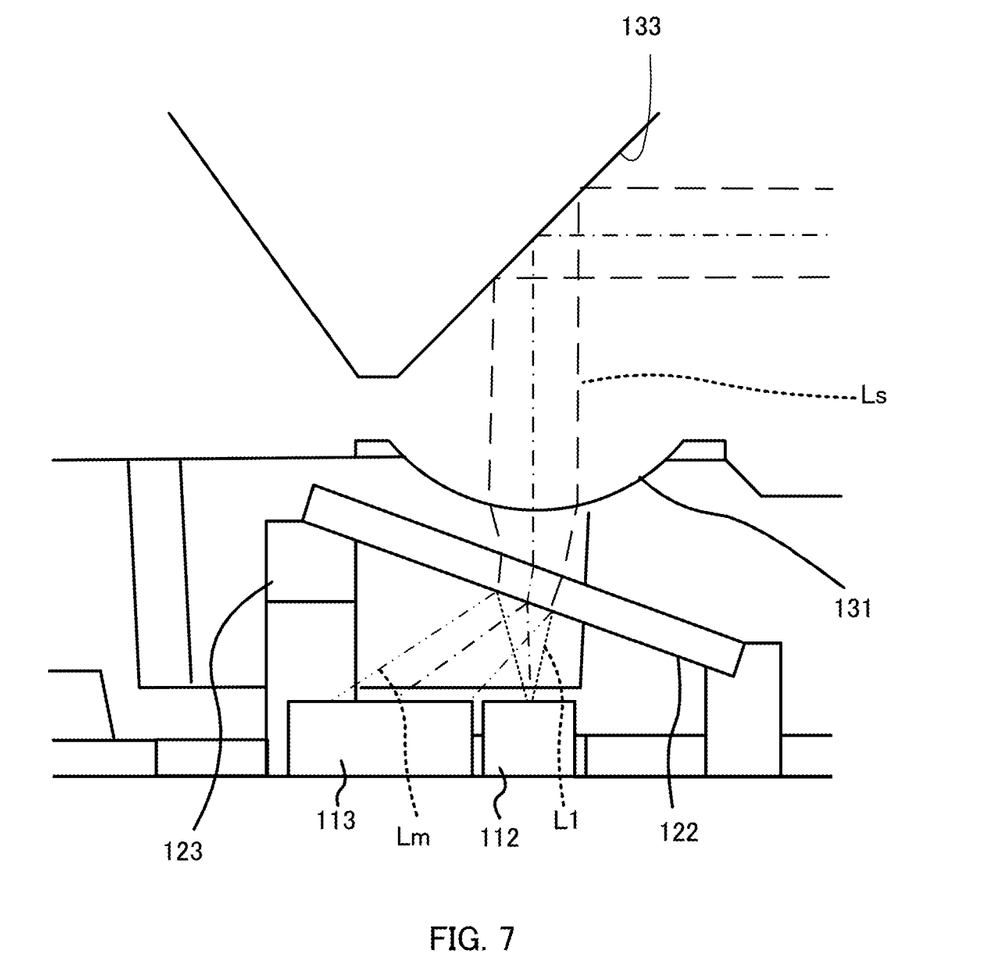
FIG. 7 is a partially enlarged view of a portion indicated with the broken line in FIG. 6.

Next, light paths in optical module 100 are described. FIG. 6 illustrates light paths in the optical module of the present embodiment, and FIG. 7 is a partially enlarged view of a portion indicated with the broken line in FIG. 6. It is to be noted that the optical axis is indicated with the dashed line. As illustrated in FIG. 7, a part of emission light L1 (indicated with the dotted line in FIG. 7) emitted from light-emitting element 112 is reflected by filter 122, and reaches detection element 113 as monitor light Lm (indicated with the chain double-dashed line in FIG. 7). On the other hand, as illustrated in FIG. 6, the remaining part of emission light L1 emitted from light-emitting element 112 passes through filter 122 and enters receptacle main body 111 from first optical surface 133 as signal light LS (indicated with the broken line in FIG. 6). Signal light Ls is converted by the first optical surface of receptacle main body 121 into collimate light, and is directed to reflection surface 133. Then, as illustrated in FIG. 6, light Ls having reached reflection surface 133 is reflected to second emission surface 132 side, and passes inside receptacle main body 121 along the front surface of substrate 111. Then, signal light Ls is emitted from second emission surface 132 of receptacle main body 121 and reaches end surface 150 of optical transmission member 140.

Method of Manufacturing Optical Module

Next, the method of manufacturing optical module of the present embodiment is described. FIGS. 8A to 8D are schematic sectional views illustrating the method of manufacturing optical module 100 according to the present embodiment. It is to be noted that, in FIGS. 8A to 8D, the hatching on the cross-section of the components is omitted.

Figure 8A:
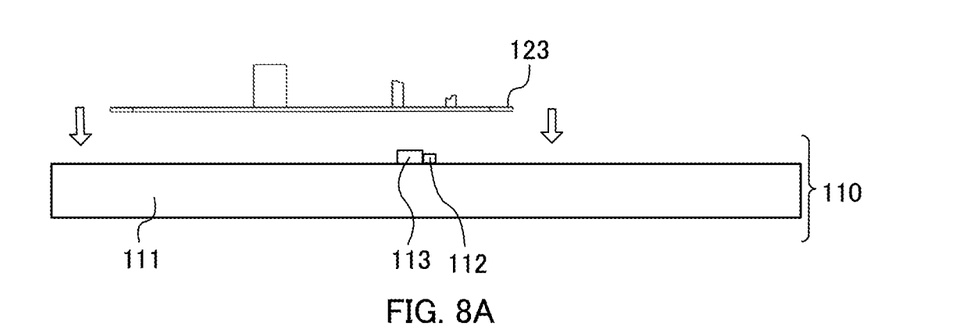
FIGS. 8A to 8D illustrate a method of manufacturing the optical module according to the embodiment.

In the present embodiment, first, holding member 123 and filter 122 are placed above substrate 111 of photoelectric conversion device 110 as illustrated in FIG. 8A (step (1)). At this time, light-emitting element 112 and detection element 113 are fitted into the through holes (not illustrated) of the holding member so that holding member 123 does not interfere with light-emitting element 112 and detection element 113 of photoelectric conversion device 110.

While filter 122 is fixed on holding member 123 after holding member 123 is disposed on substrate 111 in the present embodiment, filter 122 may be fixed on holding member 123 in advance.

Figure 8B:
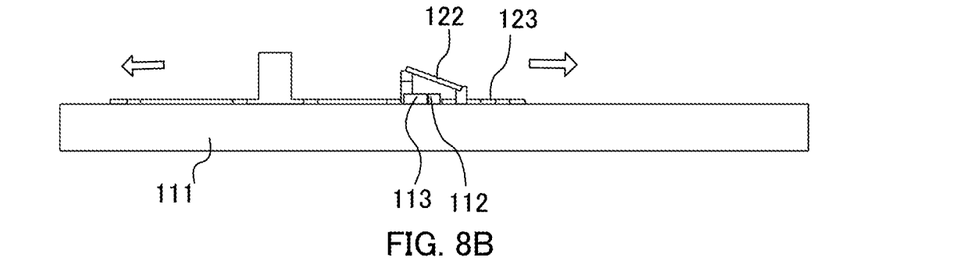

Subsequently, as illustrated in FIG. 8B, light-emitting element 112 is caused to emit light, and the position of holding member 123 is moved in parallel with the front surface of substrate 111 in a given direction to set the position of holding member 123 such that light reflected by filter 122 held by holding member 123 reaches detection element 113 (step (2)). Whether light reflected by filter 122 sufficiently reaches detection element 113 can be confirmed by measuring the intensity and quantity of light with detection element 113, for example. Then, holding member 123 is fixed on substrate 111 at a position where light reflected by filter 122 sufficiently reaches detection element 113. Holding member 123 is fixed on substrate 111 with an adhesive agent (e.g. a heat/ultraviolet curable resin), for example.

Figure 8C:
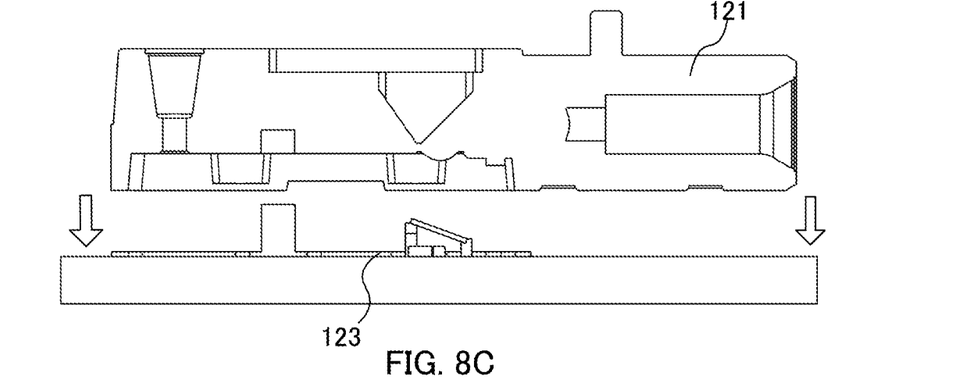
Figure 8D:
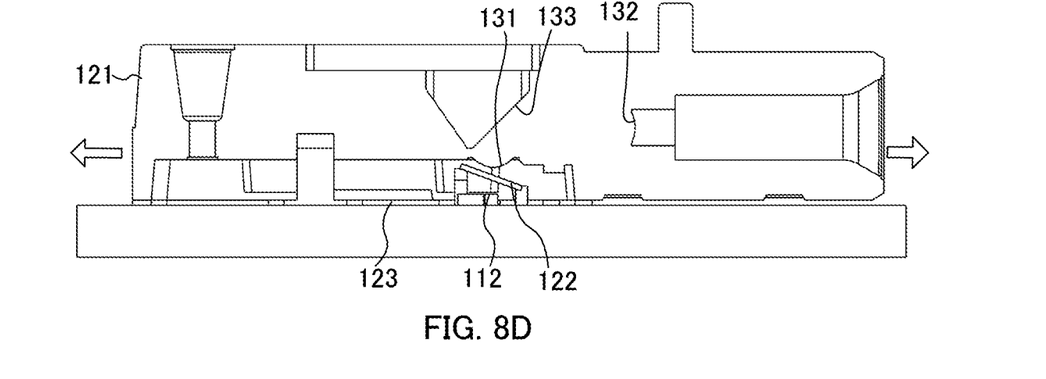

Subsequently, as illustrated in FIG. 8C, receptacle main body 121 is placed above holding member 123 (step (3)). Then, as illustrated in FIG. 8D, receptacle main body 121 is moved parallel to the front surface of substrate 111 in a given direction, and the position of receptacle main body 121 is set such that light from light-emitting element 112 which has passed through filter 122 and has entered receptacle main body 121 from first optical surface 131 of receptacle main body 121 reaches second optical surface 132 of receptacle main body 121 (step (4)).

Whether light having entered the receptacle main body 121 from first optical surface 131 reaches second optical surface 132 can be confirmed by observing light-emitting element 112 through reflection surface 133 and first optical surface 131 from second optical surface 132 side, for example. In addition, the confirmation can be performed by causing light-emitting element 112 to emit light. In this manner, the center position of the light-emitting surface of light-emitting element 112 can be appropriately detected, and receptacle main body 121 can be disposed at an appropriate position.

Thereafter, receptacle main body 121 is fixed above holding member 123 with an adhesive agent (e.g. a heat/ultraviolet curable resin) and the like.

Modification

Figure 9:
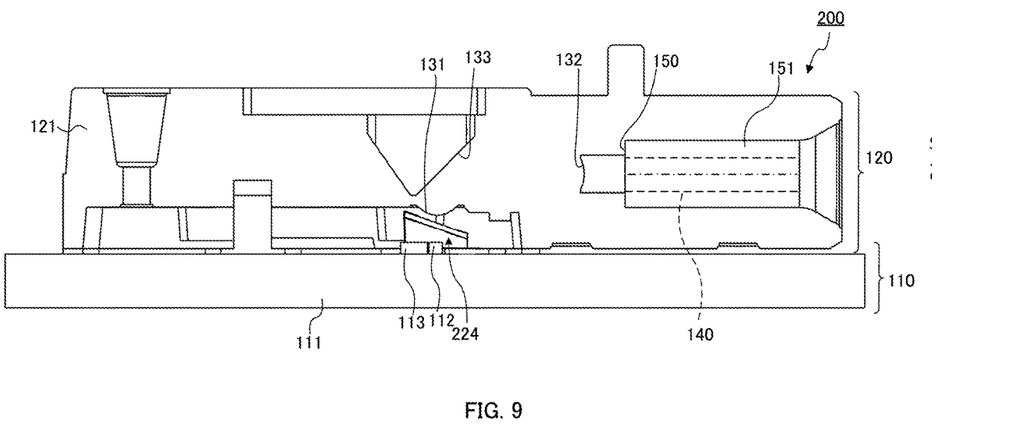
FIG. 9 is a sectional view schematically illustrating a configuration of an optical module according to a modification of the embodiment.

FIG. 9 is a sectional view schematically illustrating a configuration of optical module 200 according to a modification of the embodiment of the present invention. Optical module 200 is identical to optical module 100 except that the holding member and the filter are integrated with each other. It is to be noted that, in FIG. 9, the hatching on the cross-section of optical receptacle 120 and photoelectric conversion device 110 is omitted, and the components identical to those of optical module 100 are denoted with the same reference numerals. The holding member and the filter in the modification are described below.

Figure 10A:
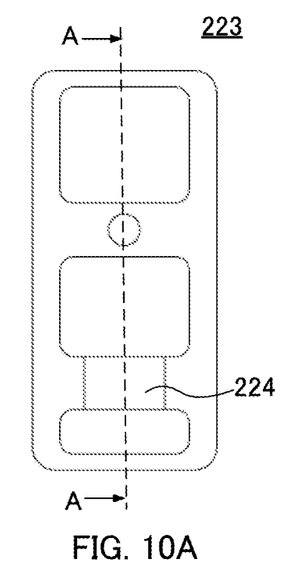
FIGS. 10A to 10F illustrate a configuration of a holding member and a filter according to a modification of the embodiment.
Figure 10B:
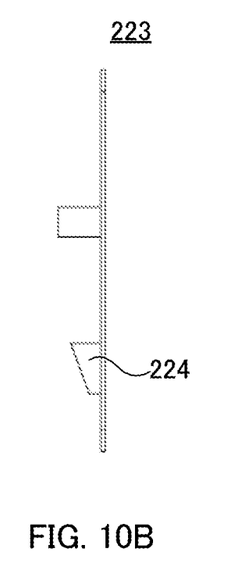
Figure 10C:
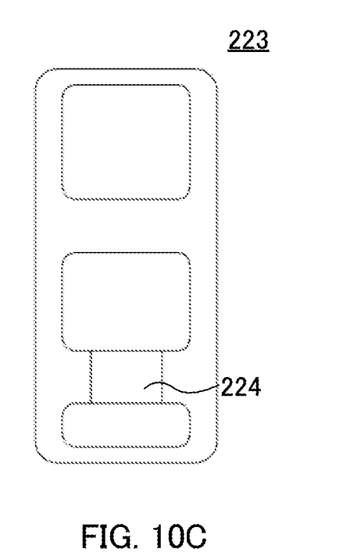
Figure 10D:
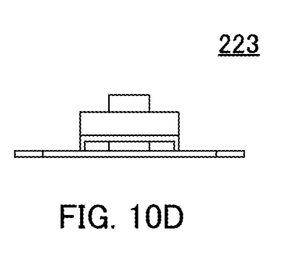
Figure 10E:
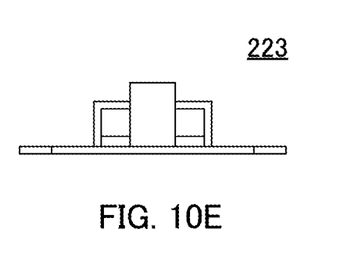
Figure 10F:
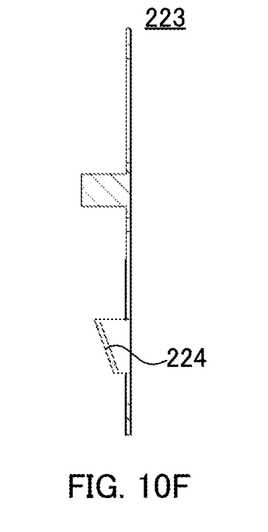

FIGS. 10A to 10F illustrate holding member 223 according to the modification. FIG. 10A is a plan view of holding member 223, FIG. 10B is a side view of holding member 223, FIG. 10C is a bottom view of holding member 223, FIG. 10D is a front view of holding member 223, and FIG. 10E is a rear view of holding member 223. In addition, FIG. 10F is a sectional view taken along line A-A of FIG. 10A. As illustrated in FIGS. 9 to 10F, holding member 223 of the modification includes protrusion 224 protruding to receptacle main body 121 side and having a top plate inclined with respect to the light-emitting surface of light-emitting element 112. As illustrated in FIG. 10F, protrusion 224 of the holding member 223 is hollow. In addition, as illustrated in FIG. 9, protrusion 224 is disposed between light-emitting element 112 and first optical surface 131 of receptacle main body 121, and light-emitting element 112 and detection element 113 of photoelectric conversion device 110 are fitted in the hollow portion.

Here, in holding member 223 of the modification, the top plate of protrusion 224 is used as a filter for separating light L1 emitted from light-emitting element 112 into monitor light Lm and signal light Ls. The configuration in which the filter and the holding member are integrated as in the modification is advantageous in that fixation of the filter is unnecessary. Here, the top plate of protrusion 224 has a uniform thickness, and the above-described reflection/transmission film (not illustrated) is formed on the surface of the top plate of protrusion 224. In addition, the top plate of protrusion 224 is inclined to the light-emitting surface of light-emitting element 112. With the top plate (filter) inclined to the light-emitting surface of light-emitting element 112, light (monitor light Lm) reflected by the top plate (filter) reaches detection element 113.

It is to be noted that the shape of the region other than the top plate of protrusion 224 is not limited as long as the light path between light-emitting element 112 and optical transmission member 140 and the like are not blocked, and it is possible to provide a through hole that communicates between the inside and the outside of the hollow portion in a part of the side surface, and the like.

Holding member 223 is not limited as long as holding member 223 is a plate-shaped base material made of a material having a high transmittance to the wavelength of light emitted from light-emitting element 112, and may be a base material made of glass, polyetherimide (PEI) and/or cyclic olefin resin.

Effect

As described above, in an optical module using conventional optical receptacle, alignment for signal light and alignment for monitor light are required to be simultaneously performed when aligning the optical receptacle with the photoelectric conversion device including the light-emitting element and the detection element. As such the alignment operation is complicated, and alignment of the optical receptacle may lead to reduction in yield.

In contrast, in the present embodiment (including the modification), holding member 123 and receptacle main body 121 of optical receptacle 120 are independent members as described above. Therefore, alignment for monitor light Lm and alignment for signal light Ls can be performed in separate steps. Accordingly, the alignment can be very readily and quickly performed. Therefore, according to optical module 100 of the present embodiment can be manufactured at low cost and in a short time.

Additional Remarks

While the photoelectric conversion device including only one light-emitting element as the photoelectric conversion element is described above, the photoelectric conversion device may include two or more light-emitting elements. In addition, in the case where the photoelectric conversion device is an optical module for transmission and reception, one or more light-receiving elements and the like may be additionally disposed on the substrate.

In addition, the optical module may be a module for reception. In this case, light emitted from the optical transmission member enters the optical receptacle from the second optical surface and passes through the inside of the optical receptacle before being emitted from the first optical surface. The emission light passes through the filter and is received by the photoelectric conversion element.

This application is entitled to and claims the benefit of Japanese Patent Application No. 2016-064117 filed on Mar. 28, 2016, the disclosure each of which including the specification, drawings and abstract is incorporated herein by reference in its entirety.

INDUSTRIAL APPLICABILITY

The optical receptacle and the optical module according to the embodiment of the present invention are suitable for optical communications using an optical transmission member, for example.

REFERENCE SIGNS LIST

10 Optical module
20 Photoelectric conversion device
21 Light-emitting element
22 Optical transmission member
23 End surface
24 Detection element
30 Optical receptacle
31 First optical surface
32 Reflection surface
33 Light separation part
34 Transmission surface
35 Second optical surface
36 Third optical surface
37 Recess
100, 200 Optical module
110 Photoelectric conversion device
111 Substrate
112 Photoelectric conversion element (light-emitting element)
113 Detection element
120 Optical receptacle
121 Receptacle main body
122 Filter
123, 223 Holding member
131 First optical surface
132 Second optical surface
133 Reflection surface
140 Optical transmission member
150 End surface
151 Ferrule
L1 Emission light emitted from light-emitting element
Ls Signal light
Lm Monitor light

The invention claimed is:

1. An optical receptacle configured to be disposed between a photoelectric conversion device and an optical transmission member, the photoelectric conversion device including: a substrate, a photoelectric conversion element disposed on the substrate, and a detection element disposed on the substrate and configured to monitor light emitted from the photoelectric conversion element, the optical receptacle being configured to optically couple the photoelectric conversion element and an end surface of the optical transmission member, the optical receptacle comprising:
   a filter disposed on a light path between the photoelectric conversion element and the optical transmission member;
   a holding member configured to hold the filter; and
   a receptacle main body, disposed nearer to the optical transmission member than the filter on the light path, including:
      a first optical surface configured to allow incidence of the light having passed through the filter, and
      a second optical surface configured to emit, toward the end surface of the optical transmission member, the light having entered the receptacle main body from the first optical surface and having passed through inside of the receptacle main body,
   wherein the filter is configured to be disposed between the photoelectric conversion device and the first optical surface of the receptacle main body,
   wherein the holding member and the receptacle main body are independent from each other, and
   wherein the filter reflects, toward a detection element side as monitor light, a part of the light emitted from the photoelectric conversion element, and allows, to pass through the filter toward the first optical surface of the receptacle main body as signal light, a remaining part of the light emitted from the photoelectric conversion element.

2. The optical receptacle according to claim 1, wherein the filter and the holding member are integrated with each other.

3. The optical receptacle according to claim 1, wherein the receptacle main body further includes a reflection surface configured to reflect, in a direction along the substrate of the photoelectric conversion device, the signal light having entered the optical receptacle from the first optical surface.

4. An optical module, comprising:

a photoelectric conversion device including: a substrate, a photoelectric conversion element disposed on the substrate, and a detection element disposed on the substrate and configured to monitor light emitted from the photoelectric conversion element; and the optical receptacle according to claim 1, wherein the filter is disposed between the photoelectric conversion device and the receptacle main body, wherein the holding member is disposed on the substrate such that the filter is opposite to the photoelectric conversion element, and wherein the receptacle main body is disposed above the holding member.

5. A method of manufacturing the optical module according to claim 4, the method comprising:

placing the holding member configured to hold the filter on the substrate of the photoelectric conversion device, wherein the photoelectric conversion device includes: the substrate, the photoelectric conversion element disposed on the substrate, and the detection element disposed on the substrate and configured to monitor light emitted from the photoelectric conversion element;

positioning the holding member such that light, which has been obtained by causing the photoelectric conversion element to emit the light and has been reflected by the filter, reaches the detection element;

disposing the receptacle main body above the holding member; and positioning the receptacle main body such that the light, which has been emitted from the photoelectric conversion element, has passed through the filter, and has entered the receptacle main body from the first optical surface, reaches the second optical surface.

* * * * *